United States Patent [19]

Chu

[11] Patent Number: 5,263,019
[45] Date of Patent: Nov. 16, 1993

[54] METHOD AND APPARATUS FOR ESTIMATING THE LEVEL OF ACOUSTIC FEEDBACK BETWEEN A LOUDSPEAKER AND MICROPHONE

[75] Inventor: Peter L. Chu, Needham, Mass.

[73] Assignee: PictureTel Corporation, Peabody, Mass.

[21] Appl. No.: 837,729

[22] Filed: Feb. 19, 1992

Related U.S. Application Data

[63] Continuation-in-part of Ser. No. 659,579, Feb. 21, 1991, which is a continuation-in-part of Ser. No. 640,477, Jan. 11, 1991, abandoned, Continuation of Ser. No. 637,016, Jan. 4, 1991, abandoned.

[51] Int. Cl.⁵ .................................................. H04J 1/00
[52] U.S. Cl. .................................. 370/32.1; 379/406; 381/83
[58] Field of Search ............... 370/32.1, 32; 381/46, 381/47, 66, 71, 83; 379/345, 392, 410, 406

[56] References Cited

U.S. PATENT DOCUMENTS

| | | | |
|---|---|---|---|
| 4,064,378 | 12/1977 | Kitayama et al. | 179/170.2 |
| 4,126,770 | 11/1978 | Tamura et al. | 179/170.2 |
| 4,232,400 | 11/1980 | Yamamoto et al. | 455/305 |
| 4,479,036 | 10/1984 | Yamamoto et al. | 179/170.2 |
| 4,525,856 | 6/1985 | Admiraal et al. | 381/93 |
| 4,539,675 | 9/1985 | Fisher | 370/32.1 |
| 4,589,137 | 5/1986 | Miller | 381/94 |
| 4,633,046 | 12/1986 | Kitayama et al. | 370/32.1 |
| 4,658,426 | 4/1987 | Chabries et al. | 381/94 |
| 4,677,676 | 6/1987 | Eriksson | 381/71 |
| 4,677,677 | 6/1987 | Eriksson | 381/71 |
| 4,683,590 | 7/1987 | Miyoshi et al. | 381/71 |
| 4,769,847 | 9/1988 | Taguchi | 381/94 |
| 4,837,834 | 6/1989 | Allie | 381/71 |
| 4,965,823 | 10/1990 | Nakagawa et al. | 379/406 |
| 5,117,418 | 5/1992 | Chaffee et al. | 370/32.1 |

FOREIGN PATENT DOCUMENTS 2191363 10/1986 United Kingdom .

OTHER PUBLICATIONS

P. L. Chu, "Quadrature Mirror Filter Design for an Arbitrary Number of Equal Bandwidth Channels", IEEE Trans. on ASSP, ASSP-33, No. 1, Feb., 1985, pp. 203-218.

P. L. Chu, "Fast Gaussian Random Noise Generator," IEEE Trans. ASSP, ASSP-37, No. 10, Oct., 1989, pp. 1593-1597.

D. L. Duttweiler, "A Twelve-Channel Digital Voice Echo Canceller," IEEE Transactions on Communications, COM-26, No. 5, May, 1978, pp. 647-653.

(List continued on next page.)

*Primary Examiner*—Douglas W. Olms
*Assistant Examiner*—Shick Hom
*Attorney, Agent, or Firm*—Fish & Richardson

[57] ABSTRACT

An improved echo cancelling device for reducing the effects of acoustic feedback between a loudspeaker and microphone in a communication system. The device includes an adjustable filter for receiving a loudspeaker signal and generating in response thereto an echo estimation signal. The device subtracts the echo estimation signal from the microphone signal to produce an echo corrected microphone signal. During periods of time when the microphone signal is substantially derived from acoustic feedback between the loudspeaker and the microphone, the device adjusts transfer characteristics of the filter to reduce the echo corrected microphone signal. The improvement includes estimating from the adjusted transfer characteristics an energy transfer ratio representative of the ratio of the energy of the microphone signal to the energy of the loudspeaker signal. The device compares the microphone signal to the energy transfer ratio multiplied by the loudspeaker signal to identify periods of time when the microphone signal is substantially derived from acoustic feedback between the loudspeaker and the microphone.

18 Claims, 7 Drawing Sheets

OTHER PUBLICATIONS

S. Gay, "Fast Converging Subband Acoustic Echo Cancellation Using RAP on the WE® DSP/16A," Proceedings of ICASSP, 1990, pp. 1141–1144.

A. Gilloire, "Experiments with Sub-band Acoustic Echo Cancellers for Teleconferencing," Proceedings of ICASSP, 1987, pp. 2141–2144.

M. J. Gingell, B. G. Hay, and L. D. Humphrey, "A Block Mode Update Echo Canceller Using Custon LSI," GLOBECOM Conference Record, vol. 3, Nov., 1983, pp. 1394–1397.

D. G. Messerschmitt, "Echo Cancellation in Speech and Data Transmission," IEEE Journal on Selected Topics in Communications, IEEE Journal on Selected Topics in Communications, SAC-2 No. 2, Mar., 1984, pp. 283–296.

Ying G. Tao, Kevin D. Kolwicz, C. W. K. Gritton, and Donald D. Duttweiler, "A Cascadable VLSI Echo Canceller", IEEE Journal on Selected Topics in Communications, SAC-2, No. 2, Mar., 1984, pp. 297–303.

S. Yamamoto, S. Kitayama, J. Tamura, and H. Ishigami, "An Adaptive Echo Canceller with Linear Predictor," The Transactions of the IECE of Japan, vol. E62, No. 12, Dec., 1979, pp. 851–857.

R. Frenzel and M. E. Hennecke, "A Robust Echo Compensator: Implementation & Realtime Measurements", IEEE ASSP Workshop on Applications on Signal Processing to Audio & Acoutics, Oct. 20–23, 1991, New Paltz, N.Y.

Hua Ye and Bo-Xiu Wu, "A New Double-Talk Detection Algorithm Based on the Orthogonality Theorm", IEEE Transaction on Communications, vol. 39, No. 11, Nov. 1991, pp. 1542–1545.

METHOD AND APPARATUS FOR ESTIMATING THE LEVEL OF ACOUSTIC FEEDBACK BETWEEN A LOUDSPEAKER AND MICROPHONE

This is a continuation-in-part of co-pending U.S. application Ser. No. 07/659,579, filed Feb. 21, 1991 which is a continuation-in-part of U.S. application Ser. No. 640,477, filed Jan. 11, 1991 (now abandoned) which is a continuation of U.S. application Ser. No. 637,016 filed Jan. 4, 1991 (now abandoned).

BACKGROUND OF THE INVENTION

The invention relates generally to reducing unwanted audio or acoustic feedback in a communication system, and particularly to an adaptive acoustic echo cancellation device for suppressing acoustic feedback between the loudspeaker and microphone of a telephone unit in a teleconferencing system. The telephone unit of a typical audio conferencing system includes a loudspeaker for broadcasting an incoming telephone signal into an entire room. Similarly, the telephone's microphone is typically designed to pick up the voice of any person within the room and transmit the voice to a remote telephone at the far end of the communication system.

Unlike conventional hand held telephone sets, conference telephone units are prone to acoustic feedback between the loudspeaker unit and microphone. For example, a voice signal which is broadcast into the room by the loudspeaker unit may be picked up by the microphone and transmitted back over the telephone lines. As a result, persons at the far end of the communication system hear an echo of their voice. The echo lags the person's voice by the round trip delay time for the voice signal. Typically, the echo is more noticeable as the lag between the person's voice and the echo increases. Accordingly, it is particularly annoying in video conferencing systems which transmit both video and audio information over the same telephone lines. The additional time required to transmit video data increases the round trip delay of the audio signal, thereby extending the lag between a person's voice and the echo.

Many conference telephones avoid echo by allowing only half duplex communication (that is, by allowing communication over the phone line to occur in only one direction at a time) thereby preventing feedback. For example, when the loudspeaker unit is broadcasting a voice, the telephone disables the microphone to prevent the loudspeaker signal from being fed back by the microphone.

While a half duplex system avoids echo, it often cuts off a person's voice in mid-sentence. For example, when both parties speak simultaneously, the telephone unit allows communication in only one direction, thereby clipping the voice of one party.

Some loudspeaker telephones employ echo cancellation in an attempt to allow full-duplex communication without echo. Conventional echo cancellation devices attempt to remove from the microphone signal the component believed to represent the acoustic feedback. More specifically, these devices prepare an electric signal which simulates the acoustic feedback between the loudspeaker and the microphone. This electric signal is subtracted from the microphone signal in an attempt to remove the echo.

Electrically simulating the acoustic feedback is difficult since the acoustic feedback is determined by the acoustic characteristics of the room containing the microphone and speaker. This is complicated by variations in the acoustic characteristics of different rooms and by the dramatic changes in a given room's characteristics which occur if the microphone or loudspeaker is moved, or if objects are moved in the room.

To compensate for the changing characteristics of the room, many echo cancellation devices model the room's characteristics with an adaptive filter which adjusts with changes in the room. More specifically, the electric signal used to drive the telephone's loudspeaker is applied to a stochastic gradient least-means-squares adaptive filter whose tap weights are set to estimate the room's acoustic response. The output of the filter, believed to estimate the acoustic echo, is then subtracted from the microphone signal to eliminate the component of the microphone signal derived from acoustic feedback. The resultant "echo corrected" signal is then sent to listeners at the far end of the communication system.

To assure that the adaptive filter accurately estimates the room's response, the device monitors the echo corrected signal. During moments when no one is speaking into the microphone, the adaptive filter adjusts its tap weights such that the energy of the echo corrected signal is at a minimum. In theory, the energy of the echo corrected signal is minimized when the adaptive filter removes from the microphone signal an accurate replica of the acoustic feedback. However, the adaptive process must be disabled whenever a person speaks into the microphone. Otherwise, the unit will attempt to adjust the tap weights in an effort to eliminate the speech.

Accordingly, echo cancellation devices which employ adaptive filters for estimating a room's response typically include a "double-talk" detection device which monitors the microphone signal to determine when a person is speaking into the microphone. One such detector, described in D. L. Duttweiler, "A Twelve Channel Digital Echo Canceller", IEEE Trans. On Comm., Volcom-26, No. 5, May 1978, declares double talk when a sample of the microphone signal is greater than or equal to one-half the largest sample of the loudspeaker signal within the last N samples, where N is a constant equal to the maximum delay between the loudspeaker and the microphone. If someone is speaking into the microphone, the energy of the microphone signal is typically at least half that of the loudspeaker signal. Accordingly, the above described double talk detector properly concludes that someone is speaking into the microphone and disables the adaptive filter from adjusting its taps.

If the loudspeaker and microphone are far apart from each other, the microphone includes little or no acoustic feedback from the loudspeaker. Further when someone is speaking softly into the microphone, the energy of the soft voice component of the microphone signal is not alone greater than half the energy of loudspeaker signal. Accordingly, the above described doubletalk detector falsely concludes that no one is speaking into the microphone and therefore enables the adaptive filter to adjust its taps. The filter accordingly begins adjusting the taps in an effort to reduce the echo-corrected microphone signal to zero. Thus, by falsely concluding that no one is speaking into the microphone, the device begins to cut off the voice of the person speaking into the microphone.

If the loudspeaker is placed close to the microphone, the energy of the microphone signal may exceed half the energy of the loudspeaker signal regardless of whether someone is speaking into the microphone. For example, if the room includes ambient background noise such as generated by a fan, the microphone picks up this sound and adds it to the substantial acoustic feedback caused by the close proximity of the microphone and loudspeaker. Accordingly, the energy of the microphone signal may exceed the half of the energy of the loudspeaker signal even when the loudspeaker is the only source of speech in the room. In this case, the above described doubletalk detector falsely concludes that someone is always speaking into the microphone and therefore permanently disables the adaptive filter from adjusting its taps.

Therefore, one object of the present invention is to provide an acoustic echo cancellation device which includes an improved double talk detector for determining when someone is speaking into the microphone.

SUMMARY OF THE INVENTION

The invention relates to an improved echo cancelling device for reducing the effects of acoustic feedback between a loudspeaker and microphone in a communication system. The device includes an adjustable filter for receiving a loudspeaker signal and generating in response thereto an echo estimation signal. The device subtracts the echo estimation signal from the microphone signal to produce an echo corrected microphone signal. During periods of time when the microphone signal is substantially derived from acoustic feedback between the loudspeaker and the microphone, the device adjusts transfer characteristics of the filter to reduce the echo in the echo corrected microphone signal. The improvement includes estimating from the adjusted transfer characteristics an energy transfer ratio representative of the ratio of the energy of the microphone signal to the energy of the loudspeaker signal. The device compares the microphone signal to the energy transfer ratio multiplied by the loudspeaker signal to identify periods of time when the microphone signal is substantially derived from acoustic feedback between the loudspeaker and the microphone.

In one embodiment, the adjustable filter is a digital filter having a plurality of taps. The value of the taps define the transfer characteristics of the adjustable filter. The device calculates the energy transfer ratio by first filtering a plurality of the tap values with a bandpass filter to produce a plurality of filtered tap values. It then computes the square of each filtered tap value and sums the squared filtered tap values. More specifically, the device computes the energy transfer ratio from the plurality of the taps according to the equation:

$$G_n = \sqrt{\sum_{l=2}^{l=L-1} ((h_n(l) - h_n(l-2))^2}$$

where $G_n$ is the energy transfer ratio in band n, L is the total number of taps for the filter, and $h_n(l)$ is the tap value for tap l in band n (see also Equation 6 supra).

In another embodiment, the device includes a clipper for attenuating the echo corrected microphone signal during selected periods of time. The device calculates from the adjusted transfer characteristics a room reverberation estimate representative of room's reverberation. It then compares the echo corrected microphone signal to the room reverberation estimate. During periods of time when the echo corrected microphone signal is less than the room reverberation estimate, the device enables the signal clipper to attenuate the echo corrected microphone signal. More specifically, for embodiments in which the adjustable filter is a digital filter, the device calculates the room reverberation estimate according to the formula:

$$RE_n(i) = E_l \times \sqrt{\sum_{l=P}^{l=L-1} ((h_n(l) - h_n(l-2))^2}$$

where $RE_n(i)$ is the room reverberation estimate in band n at tap i, $E_l$ is the loudspeaker energy value, L is the number of taps for the filter, P is a constant which is slightly greater than the propagation time (in samples) for the acoustic signal to propagate from the loudspeaker to the microphone, and $h_n(j)$ is the tap value of filter tap j in band n (see also Equation 10 supra).

Other objects, features and advantages of the invention are apparent from the following description of particular preferred embodiments taken together with the drawings.

DESCRIPTION OF THE PREFERRED EMBODIMENTS

Figure 1:
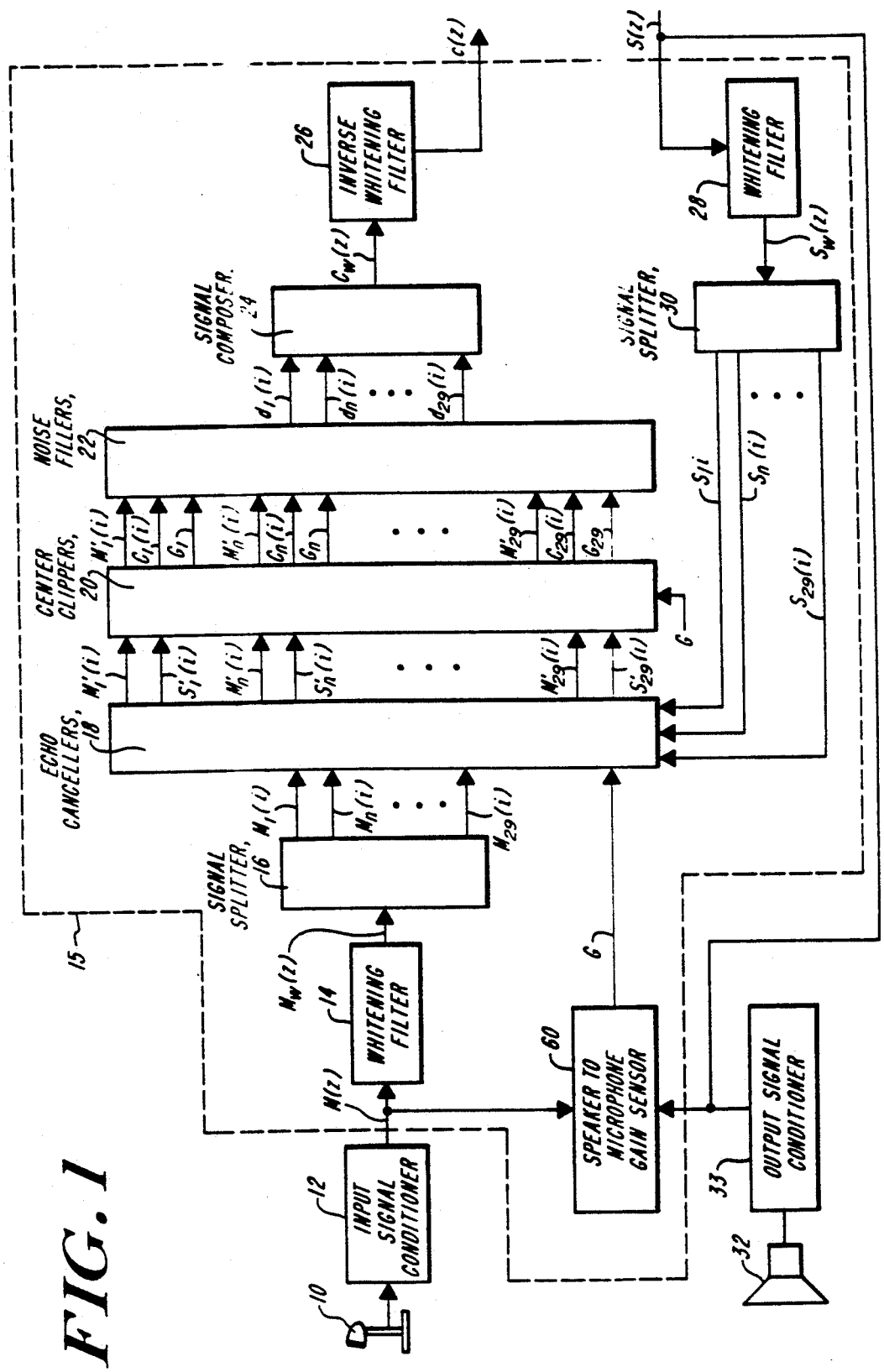
FIG. 1 is a block diagram of an echo cancellation device.

Referring to FIG. 1, a microphone 10 converts speech and other acoustic signals in a room into an analog electronic microphone signal. The electronic signal is applied to input signal conditioner 12 which filters the signal with a 7 KHz low pass filter and digitizes the filtered signal at a 16 KHz sampling rate. The resultant digitized microphone signal m(z) (where z is an integer representing the time at which sample m(z) was taken, measured in terms of a number of samples at a 16 KHz sampling rate) is applied to echo cancellation system 15 which processes the microphone signal to remove any echo components, and transmits the echo corrected signal to the far end of the communication system. Echo cancellation system 15 is preferably implemented by a 60 MHz DSP16A processor.

A digitized electronic speaker signal s(z), representing the voice of persons at the far end of the communication system, is received at the near end of the system. The speaker signal s(z) is applied to an output signal conditioner 33 which processes the signal, converting it to an analog electronic signal. The analog signal is applied is loudspeaker 32 which reproduces the voice signal, broadcasting the reproduced voice into the room. The digitized speaker signal s(z) is also applied to echo cancellation system 15 for use in estimating the echo contained in the microphone signal.

Within echo cancellation system 15, m(z) is first passed through a whitening filter 14 which spreads the spectrum of m(z) more evenly across the bandwidth of m(z) while preserving the voice information contained in m(z). The resultant whitened signal $m_w(z)$ generated by filter 14 is then applied to a splitter 16 which separates $m_w(z)$ into twenty-nine distinct frequency bands and shifts each band limited signal into the baseband forming baseband signals $m_n(i)$.

The bandlimited baseband signals $m_n(i)$ (where i represents the time at which sample $m_n(i)$ is taken, measured in terms of a number of samples taken at a lower sample rate to be discussed below) are then applied to a bank 18 of echo cancellers which subtract from each signal $m_n(i)$ an estimation of the echo in the band n. To estimate the echo in each band, the loudspeaker signal s(z) is whitened and band filtered in the same manner as the microphone signal m(z). More specifically, s(z) is passed through a whitening filter 28 which is similar to or identical to whitening filter 14. The whitened loudspeaker signal $s_w(z)$ is then separated by signal splitter 30 into its spectral components, represented by a set of twenty-nine bandpass loudspeaker signals $s_b(i)$, and each component is shifted into the baseband. As will be explained more fully below, each baseband loudspeaker signal $s_n(i)$ is then passed through a corresponding least-means-squared filter (within the bank of echo cancellers 18) which models the response of the channel between loudspeaker 32 and microphone 10 in the frequency band n. The output of each filter is used as the estimated echo signal to be subtracted from $m_n(i)$.

Subtracting the estimated echo signal from the corresponding band limited microphone signal $m_n(i)$ eliminates most of the acoustic feedback between loudspeaker 32 and microphone 10 in band n. The remaining residual echo is typically not noticeable because the voice of persons speaking into microphone 10 tends to mask the presence of the residual echo. However, during moments when there is no such near end voice signal, the residual echo is more apparent.

To eliminate any noticeable residual echo, the echo corrected signals m'(i) are applied to a bank of twenty-nine center clippers 20. Bank 20 includes a center clipper for each bandlimited microphone signal $m'_n(i)$. Each center clipper monitors a corrected signal $m'_n(i)$ to determine when it falls below a certain threshold. When $m'_n(i)$ drops below the threshold, the center clipper assumes that $m'_n(i)$ contains no near end speech. Accordingly the clipper begins gradually attenuating the corrected signal $m'_n(i)$ to zero to eliminate the residual echo in band n.

Center clipping thus operates independently in each band. If a narrow band voice signal (e.g., a high pitched voice or a whistle) is applied to the microphone, center clipping will highly attenuate the microphone signal in all silent bands, allowing the bands containing the narrow band voice signal to pass without clipping. Thus, echo is completely eliminated in all attenuated bands containing no near end speech. In the other bands, the echo cancellers 18 remove most of the echo, any residual echo being masked by the narrow band voice signal.

While clipping eliminates noticeable residual echo, it introduces noticeable changes in background noise as it is activated and deactivated. For example, assume the microphone picks up the sound of a fan operating in the room at the near end of the communication system. Since this sound is not an echo, it tends to pass through the echo cancellers 18. However, when center clipping engages to fully eliminate echo, it also suppresses the sound of the fan. Thus, the listeners at the far end hear the fan drift in and out as clipping is engaged and disengaged. To eliminate this annoying side effect of center clipping, the clipped signals are applied to a bank of noise fillers which add to the clipped signals a noise signal which mimics the clipped background noise.

After the bandlimited signals are processed by bank 22 of noise fillers, they are applied to composer 24 which assembles them into a composite signal $c_w(z)$. Finally, the composite signal $c_w(z)$ is applied to an inverse whitening filter 26 which performs the inverse operation of the whitening filter 14, thereby returning the signal to a form ready for transmission to listeners at the far end.

Figure 2:
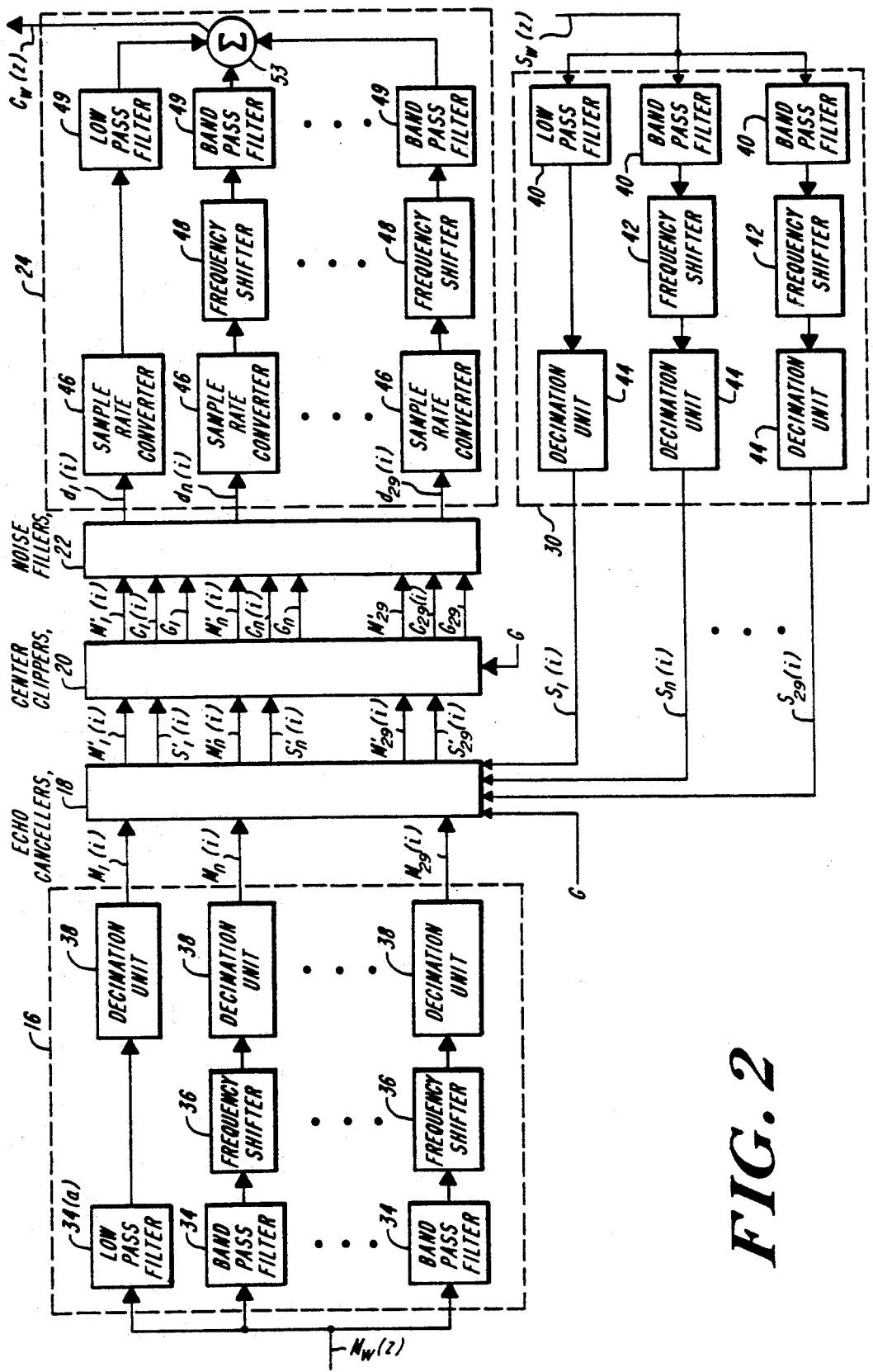
FIG. 2 is a block diagram of an echo cancellation device, showing the signal splitters in further detail.

Referring to FIG. 2, the separation of the microphone and speech signals into a set of bandlimited signals is now described in more detail. Within splitter 16, the whitened microphone signal $m_w(z)$ is first applied to a bank of digital bandpass filters 34 which separate $m_w(z)$ into its spectral components. The bandwidths of the filters cover the entire 7 KHz frequency spectrum of $m_w(z)$ without gaps. Toward this end, the filter bandwidths preferably overlap.

Low complexity methods are known in the art for implementing a bank of bandpass filters in which each filter has the same bandwidth. See e.g., R. F. Crochiere et al., "Multirate Digital Signal Processing, Prentice Hall, Englewood Cliffs, N.J., 1983; P. L. Chu, "Quadrature Mirror Filter Design for an Arbitrary Number of Equal Bandwidth Channels," IEEE Trans on ASSP, ASSP-33, No. 1, February 1985 p.203-218. A bank of filters made according to these techniques span frequencies from zero to one half the sampling rate of the signal applied to the bank of filters. The microphone signal m(z) applied to the bank of bandpass filters 34 is sampled at 16 KHz. Accordingly, a bank of filters implemented according to the sampled techniques covers frequencies up to 8 KHz, i.e., one half the sampling rate. However, since m(z) is previously low pass filtered by signal conditioner 12 to eliminate frequencies above 7 KHz, the highest frequency filters in the bank which lie in the low pass filter's transition band may be ignored.

Several factors must be weighed in choosing the number of filters in the bank. For example, using a large number of filters reduces the bandwidth of each filter, which, as be explained more fully below, reduces the number of computations required to process a given bandlimited signal. However, such reduction in bandwidth increases the delay introduced by each filter. Further, a large number of filters yield many bandlimited signals $m_n(i)$, thereby increasing the computational cost of implementing the bandpass filters, echo cancellers, center clippers and noise fillers. Accordingly, in the preferred embodiment, the bank of bandpass filters 34 contains 32 filters covering frequencies up to 8 KHz. Only the lower 29 filters are used, however, since the input microphone signal m(z) has only a 7 KHz bandwidth.

Each filter 34 is a 192 tap, symmetric FIR (finite impulse response) filter having a magnitude response equal to the square root of a raised cosine. This response is preferable since it gives a smooth transition from passband to stopband. Each filter thus has a 250 Hz, 3 dB bandwidth and a 500 Hz, 40 dB bandwidth. Attenuation at the 500 Hz bandwidth must be high to prevent aliasing.

Each bandlimited signal (with the exception of the output of lowpass filter 34(a) which is baseband), is then applied to a frequency shifter 36 which modulates the bandlimited signal to shift its frequency spectrum downward to the baseband.

Since the full band microphone signal m(z) is sampled at 16 KHz, each band limited signal is also sampled at the same 16 KHz rate. However, since each bandlimited signal has a much narrower bandwidth than the microphone signal, many of these samples are redundant. Accordingly, each bandlimited signal is decimated by a decimation unit 38 to reduce the sampling rate to approximately the Nyquist rate, that is, twice the bandwidth of the filter 34. In the preferred embodiment, decimation units 38 subsample at 1 KHz, or one sixteenth of the original sampling rate. This dramatically reduces the number of samples, thereby reducing the number of computations required in implementing the subsequent echo cancellation, center clipping and noise filling. Bandpass filters 34, frequencies shifters 36 and decimation units 38 are implemented in a Weaver single sideband modulator structure as proposed in R. E. Crochiere et al, "Multirate Digital Signal Processing", Prentice Hall, Englewood Cliffs, N.J. (1983) incorporated herein by reference.

The whitened loudspeaker signal $s_w(z)$ must also be split into its frequency components for purposes of estimating the echo in each band. Accordingly, $s_w(z)$ is passed through a bank of bandpass filters 40 which separate $s_w(z)$ into distinct frequency bands (which are the same as those used in the microphone path). The resultant bandlimited signals are then shifted downward in frequency to the baseband by frequency shifters 42, and undersampled by decimation units 44 to eliminate redundant samples.

The bandlimited microphone signals $m_n(i)$ are processed by echo cancellers 18, center clippers 20 and noise fillers 22 independently in each band. At the completion of this processing, the bandlimited signals are reconstructed into a composite signal $c_w(z)$. Accordingly, each bandlimited signal provided by noise fillers 22 is first applied to a set of sample rate convertors 46 which increase the sampling rate of each signal back to 16 KHz. More specifically, each sample rate converter adds fifteen new samples between each pair of existing samples, each new sample having a value of zero. Next, frequency shifters 48 shift each band limited signal upward in frequency to the band in which it initially resided. The resultant set of bandlimited signals are applied to a set of band pass filters 49 which, in effect, replace each of the new samples of value zero with a value derived from interpolating between neighboring samples. The signals are then applied to adder 53 which combines the bandlimited signals to yield the composite signal $c_w(z)$. A Weaver single sideband modulator structure is employed in implementing sample rate converters 46, frequency shifters 48, and bandpass filters 49.

Figure 3:
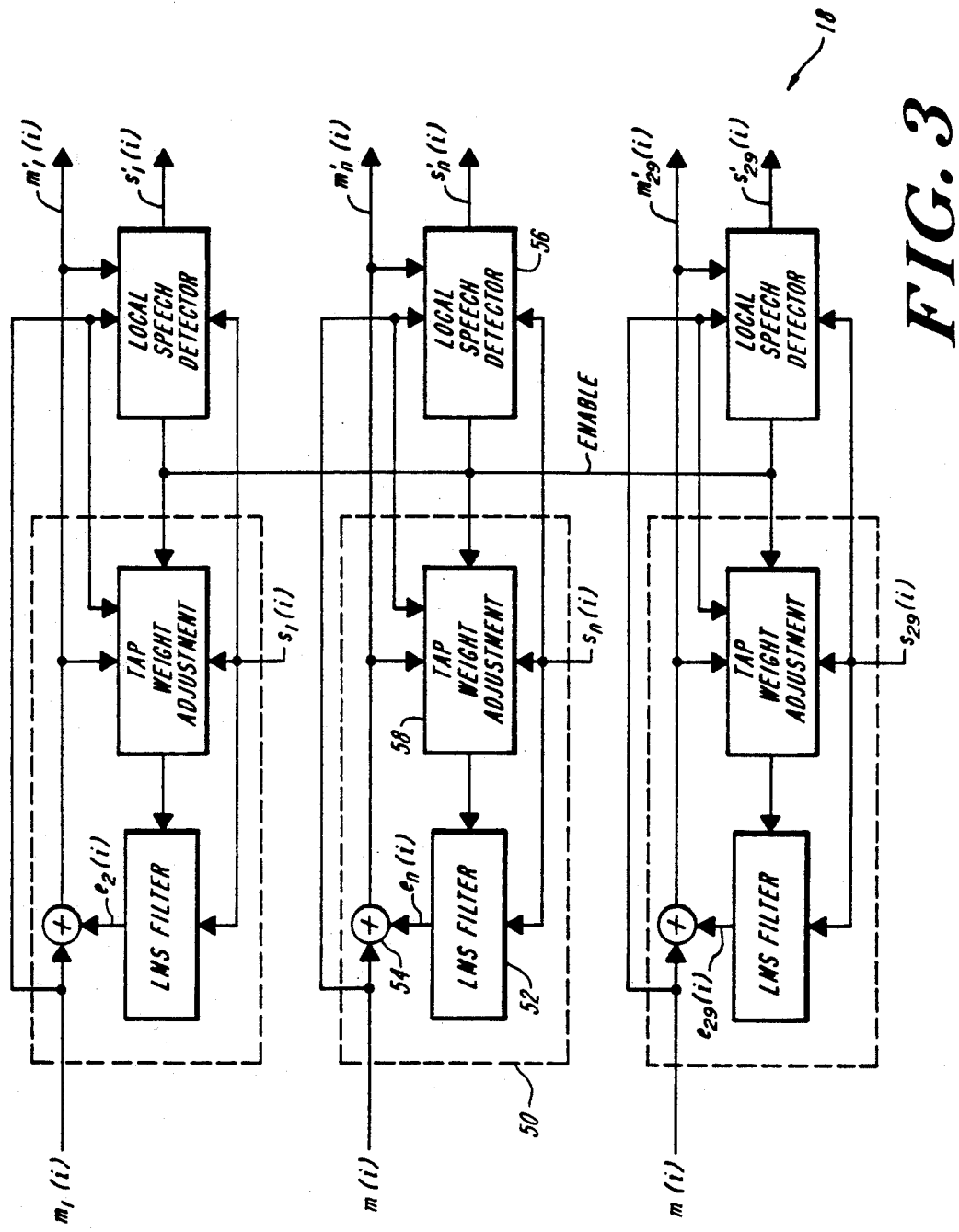
FIG. 3 is a block diagram of a bank of adaptive filters for performing echo cancellation on a set of bandlimited signals.

Referring to FIG. 3, the following describes in more detail the implementation of echo cancellation on each bandlimited microphone signal, $m_n(i)$. Bank 18 includes an adaptive filter for each band. Each adaptive filter estimates the echo in a corresponding band and removes the estimated echo from the corresponding bandlimited microphone signal. Adaptive filter 50, for example, removes the acoustic echo in band n from the bandlimited microphone signal, $m_n(i)$. Toward this end, adaptive filter 50 includes a least-means-square ("LMS") filter 52 whose tap weights are chosen to model the response of the channel between loudspeaker 32 and microphone 10 in the frequency band n.

The bandlimited loudspeaker signal $s_n(i)$ in the same band, n, is applied to the input of LMS filter 52. In response, filter 52 generates an estimate $e_n(i)$ of the acoustic feedback of $s_n(i)$. The estimated echo $e_n(i)$ is then applied to a subtractor 54 which removes the estimated echo signal from $m_n(i)$ to produce an echo corrected signal $m'_n(i)$.

Adaptive filter 50 continuously monitors the corrected signal $m'_n(i)$ to determine whether the LMS filter 52 accurately models the response of the channel between the loudspeaker and microphone. More specifically, echo canceller 18 includes for each band n, a local speech detector 56 which determines whether the bandlimited microphone signal $m_n(i)$ includes any near end speech. When no one is speaking into the microphone, the microphone signal $m_n(i)$ contains only the acoustic feedback from the loudspeaker and any background noise from the room. Thus, if LMS filter 52 properly models the room response, the corrected signal $m'_n(i)$ should be approximately zero during this time (assuming the background noise is relatively small). Accordingly, if $m'_n(i)$ is too large during a moment when local speech detector 56 indicates that no one is speaking at the near end, a tap weight adjustment module 58 within adaptive filter 50 adjusts the tap weights of the LMS filter to reduce $m'_n(i)$ thereby more closely modeling the room response.

The LMS filter 52 for band n is a conventional least means square adaptive filter having L taps. Filter 52 derives its output $e_n(i)$ in response to the input $s_n(i)$ according to the equation.

$$e_n(i) = \sum_{j=0}^{L-1} h_n(j) \times s_n(i - j) \quad (1)$$

were $h_n(j)$ is the tap weight of the jth tap of the filter.

The number of taps L required to model the room's response depends on the reverberance of the room in band n. The reverberance varies with the size of the room and losses due to absorption. For frequencies below roughly 1500 Hz and room sizes of twenty by thirty by ten feet, the echo drops by 20 dB in energy in approximately 0.1 seconds. At higher frequencies, the time for echo reverberance to settle is much shorter since more energy is lost as the loudspeaker signal reflects off the room walls. Hence, in the preferred embodiment, each LMS filter in the seven bands below 1500 Hz have one hundred and twenty eight taps. Each filter in the remaining twenty-two higher bands each include only forty-eight taps.

The following describes a preferred method for adjusting the tap weights to adaptively model the response of the channel between loudspeaker 32 and microphone 10. For the moment in time i+K, module 58 computes the value of the filter's jth tap weight $h_n(j,i+K)$, according to the following equation:

$$h_n(j,i + k) = h_n(j,i) + 2B_n \times \sum_{p=0}^{K-1} c_n(i + K - p - l) \times \quad (2)$$

-continued $$s_n(i + K - p - l)$$

where, as described more fully below, K is a thinning ratio, $B_n$ is a normalization factor, and $C_n$ is an output of center clippers 20.

The normalization factor $B_n$ for band n is proportional to the reciprocal of the maximum instantaneous energy $E_n(i)$ of the bandlimited loudspeaker signal $s_n(i)$ within the last L samples, i.e., $B_n = B/2E_n(i)$ where B is a constant. In general, larger values of B yield faster adaptation speeds at the expense of a less accurate estimation of the echo once the adaptive filter has settled. The preferred embodiment sets B equal to $2^{-8}$.

Figure 4A:
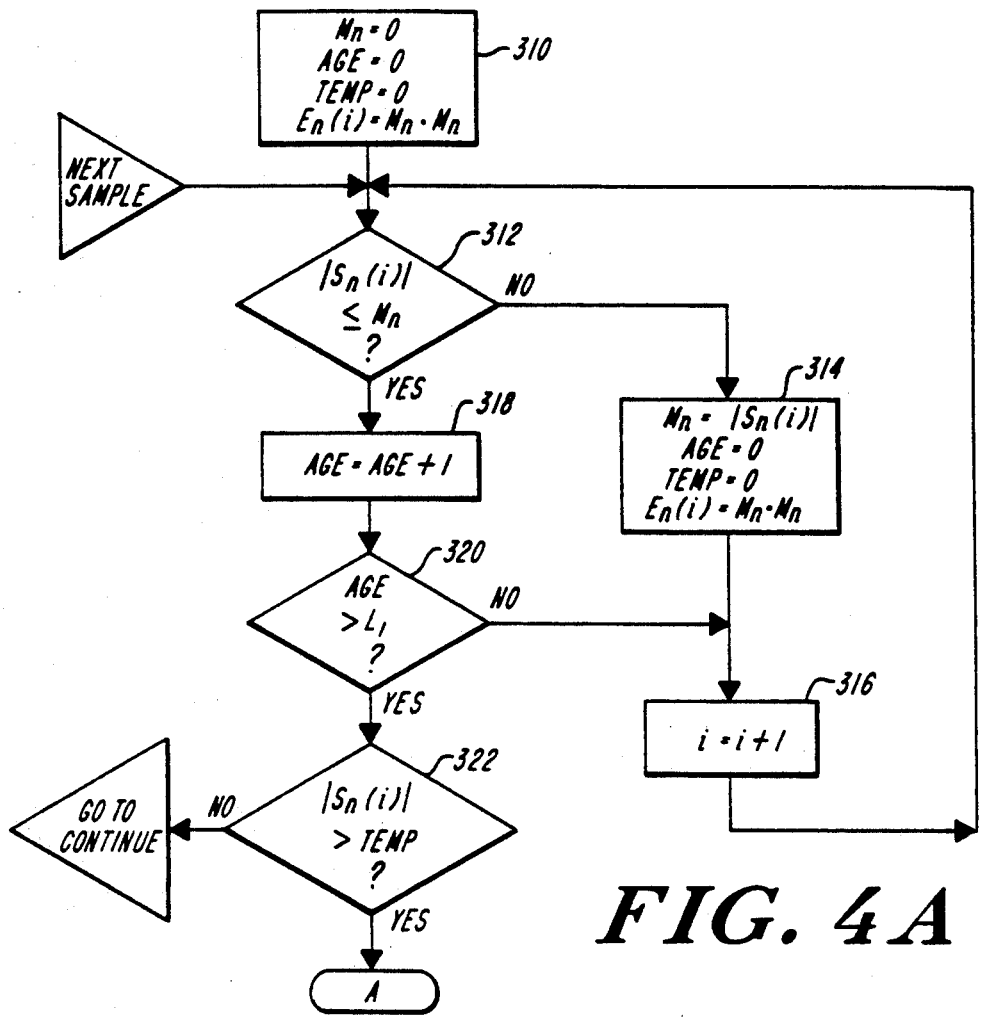
FIGS. 4(a) and 4(b) are a flow chart illustrating a procedure used in updating the tap weights of an adaptive filter.
Figure 4B:
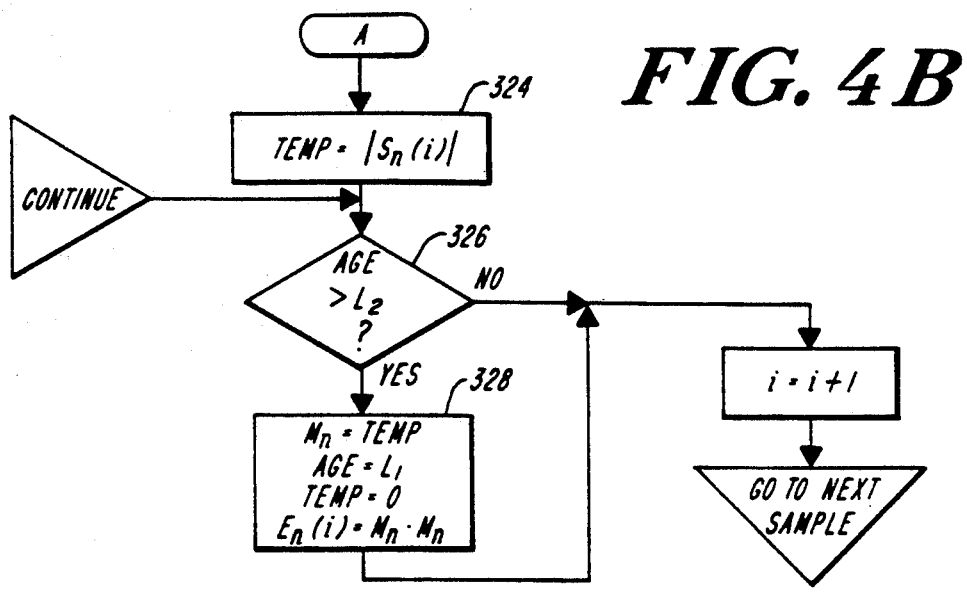

Referring to FIGS. 4(a) and 4(b), module 58 (FIG. 3) maintains a running maximum $M_n$ of the bandlimited loudspeaker signal $s_n(i)$ for purposes of computing the normalization factor $B_n$. $M_n$ is initially set equal to zero. (Step 310). Upon arrival of each sample of $s_n(i)$, module 58 compares the absolute value of the sample $s_n(i)$ to $M_n$. (Step 312). If the most recent sample is greater than $M_n$, $M_n$ is set equal to the absolute value of $s_n(i)$ and $E_n(i)$ is correspondingly updated (i.e., $E_n(i) = M_n \cdot M_n$). (Step 314). The next sample of $s_n(i)$ is then fetched and compared against the new $M_n$. (Steps 316, 312).

If the magnitude of latest sample $s_n(i)$ is less than the current $M_n$, $M_n$ remains unchanged. However, a parameter "age" (initially set to zero in step 310) is incremented to indicate that a new sample has arrived since $M_n$ was last updated. (Step 318). As each new sample is fetched and compared to $M_n$, the parameter age is incremented until the next sample arrives which exceeds $M_n$. If the age parameter exceeds a threshold $L_1$ (preferably equal to L/2), module 58 begins maintaining a temporary maximum, "Temp" (Steps 320, 322). More specifically, as each new sample $s_n(i)$ arrives, it is also compared to "Temp" (initially set to zero in Step 310). (Step 322). If the magnitude of the new sample is greater than Temp, Temp is replaced with the magnitude of the new sample. (Step 324). If the age parameter exceeds a second threshold $L_2$ (preferably equal to 1.5 L), $M_n$ is discarded and replaced with Temp. (Steps 326, 328). The maximum energy $E_n(i)$ is accordingly recomputed and age is updated to indicate the approximate age of the value Temp, i.e., $L_1$. (Steps 330, 322) Temp is accordingly reset to zero. In this manner, the normalization factor $B_n$ for each band n is continually maintained proportional to the maximum instantaneous energy of the loudspeaker signal in band n over the last L samples.

The thinning ratio K in equation 2, determines how often each tap weight is updated. See M. J. Gingell, "A Block Mode Update Echo Canceller Using Custom LSI", Globecom Conference Record, vol. 3, November 1983, p. 1394–97. For example, if K=1, each tap weight is updated with each new sample of $s_n(i)$ and $m'_n(i)$. In the preferred embodiment, each tap weight is updated once every eight samples of $s_n(i)$, $m'_n(i)$. (i.e., K=8). Further the tap weights are not all updated simultaneously. Upon receipt of a new sample, a first set of tap weights, consisting of every eighth tap weight, is adjusted. Upon arrival of the next sample, module 58 adjusts the weights of all taps adjacent to the taps in the first set. Module 58 repeats this procedure updating the next set of adjacent tap weights with the arrival of each new sample. Upon the arrival of the ninth sample, module 58 returns to the first set of taps to begin a new cycle.

Thus, when the room's acoustic response changes, as for example when the microphone is moved, the tap weights are automatically adjusted according to equation 2. However, the above algorithm is very slow to adjust the tap weights if signals $s_n(i)$ and $m_n(i)$ are highly correlated, narrow band signals. Since speech tends to be a highly correlated, narrow band signal, the tap weights should adjust slowly. However, to hasten convergence, the system employs whitening filters 14, 28 to remove the signal correlation and broaden the spectrum of the signals. Whitening filters 14, 28 are simple fixed, single zero filters having the transfer function:

$$h(z) = 1 - 0.95/z \qquad (3)$$

After echo cancellation and other signal processing are performed on the whitened signals, inverse whitening filter 26 undoes the effect of whitening filters 14, 28. Accordingly, the inverse filter's transfer function is the reciprocal of the function h(z):

$$g(z) = 1/h(z) = 1/(1 - 0.95/z) \qquad (4)$$

The bandpass architecture also assists in hastening convergence, since, in each band, a signal appears more random and flatter in spectrum.

Ideally, module 58 should only update the tap weights when the microphone signal is primarily due to the acoustic feedback from the loudspeaker. If a significant component of the microphone signal results from near end speech into the microphone, continued application of the above described technique to recalculate the weights will cause the tap weights to diverge.

Figure 5:
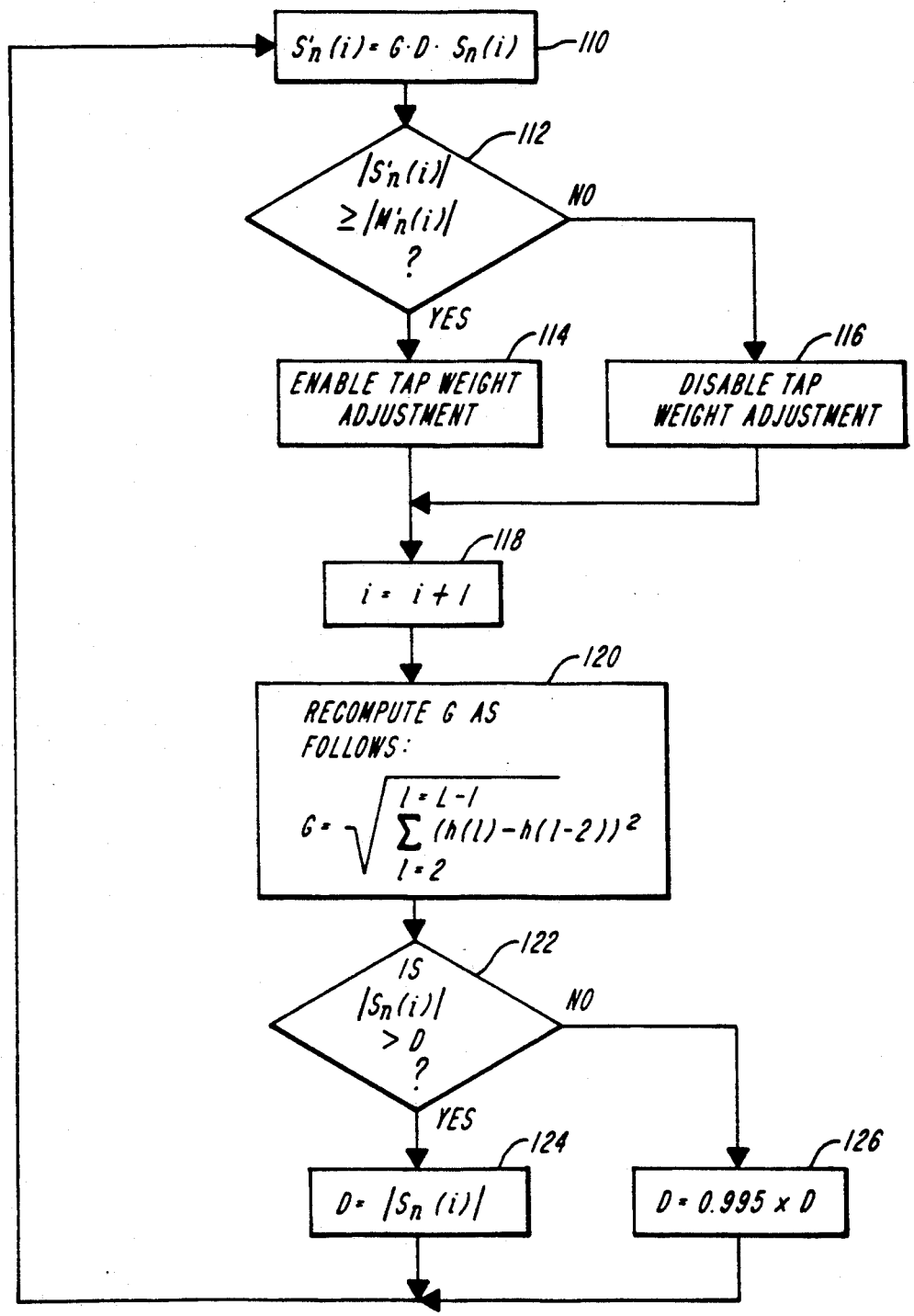
FIG. 5 is a flow chart illustrating a procedure for determining if the microphone signal includes near end speech.

Referring to FIG. 5, to determine whether a bandlimited microphone signal $m_n(i)$ includes near end speech, local speech detector 56 compares the microphone signal $m_n(i)$ to an attenuated sample of the speaker signal $s'_n(i)$ to determine whether the microphone signal is sufficiently greater than the loudspeaker signal to suggest that the microphone signal includes near end speech. Toward this end, the local speech detector first computes, for each sample of the bandlimited loudspeaker $s_n(i)$, an attenuated version $s_n(i)$ as follows:

$$s'_n(i) = G_n \cdot D \cdot s_n(i) \qquad (5)$$

where $G_n$ is the loudspeaker to microphone gain in band n, (described below) and D is a delay factor which varies with the magnitudes of past samples of the loudspeaker signal (Step 110). If the attenuated loudspeaker signal $s'_n(i)$ is greater than or equal to the microphone signal $m_n(i)$, detector 56 assumes that acoustic feedback predominates and therefore asserts the enable signal calling for adjustment of the tap weights. (Steps 112, 114). If $s'_n(i)$ is less than $m_n(i)$, the detector assumes that the microphone signal includes near end speech. Accordingly, it negates the enable signal, causing module 58 to freeze the tap weights of all adaptive filters at their present values. (Steps 112, 116). Thus, if a local speech detector recognizes speech in any band, the adaptive filters of all bands freeze.

The gain $G_n$ represents an estimate of the ratio of the energy of the loudspeaker component $ML_n(i)$ of the microphone signal (due to acoustic feedback) to the energy of the loudspeaker signal $s_n(i)$ as a whole, namely $ML_n^2(i)/s_n^2(i)$. The local speech detector regularly updates the estimate of the gain $G_n$ to accommodate changes in the gain such as when the microphone or loudspeaker are repositioned relative to each other. Thus, the criteria described above for determining whether the microphone signal includes local speech also vary with such changes.

Since the adaptive filter computes an estimate $e_n(i)$ of the acoustic feedback into the microphone signal, the gain $G_n$ could be estimated simply by computing the ratio of the average energy of the estimated feedback $e^2_n(i)$ to the average energy of the loudspeaker signal as a whole $s^2_n(i)$. However, the local speech detector 56 instead estimates the gain $G_n$ using the tap weights $h_n(l)$ of the adaptive filter:

$$G_n = \sqrt{\sum_{l=2}^{l=L-1} ((h_n(l) - h_n(l-2))^2} \quad (6)$$

Since the tap weights of the adaptive filters are already calculated, computing an estimate of the loudspeaker to microphone gain according to equation (6) requires little additional processing.

The following explains why equation (6) provides an accurate estimate of the gain. First, the adaptive filter computes, for each sample of the loudspeaker signal, an estimate of the resultant acoustic feedback into the microphone signal $e_n(i)$ as follows:

$$e_n(i) = \sum_{l=0}^{l=L-1} s_n(i-1) \times h_n(l) \quad (7)$$

where L is the number of taps in the adaptive filter. The computation of the energy of this estimated signal $e^2_n(i)$, is simplified if the bandlimited loudspeaker signal $s_n(i)$ is assumed to be a stationary white signal. This assumption is reasonable since whitening filter 28 (FIG. 1) whitens the loudspeaker signal s(z) and since the bandlimited signal $s_n(i)$ appears white in the narrow band n. Based on this assumption, the energy of $e_n(i)$ is given as follows:

$$e_n^2(i) = \sum_{l=0}^{l=L-1} s_n^2(l) \times h_n^2(l) \quad (8)$$

because the cross-correlation between the loudspeaker signal and delayed versions of itself is zero, and the energy of each sample is the same for all samples. Accordingly, the energy transfer ratio between the loudspeaker and microphone (i.e., the loudspeaker to microphone gain) is represented simply by the sum of the squares of all taps of the adaptive filter:

$$\frac{e_n^2(i)}{s_n^2(i)} = \sum_{l=0}^{l=L-1} h_n^2(l) \quad (9)$$

However, the speaker to microphone gain $G_n$ derived according to equation 9 is only accurate if the adaptive filter's transfer function (determined by the tap weights) accurately models the room's characteristics. In this regard, the adaptive filter's transfer function is likely to misrepresent the room's characteristics for low frequencies near DC and high frequencies near the top of the band n. More specifically, recall that the proper values of the adaptive filter tap weights are determined by adjusting the tap weights until the acoustic feedback is reduced to zero. Yet, since each of the bandpass filters 34 and 40 (FIG. 2) block low frequencies near the low end of the band and high frequencies near the top of the band, there is little or no acoustic feedback at both ends of the band. Accordingly, the tap weights may provide the adaptive filter with an arbitrary gain for the upper and lower frequencies of the band. To the extent the tap weights do not accurately model the room's response in the upper and lower frequencies, the tap weights may corrupt the estimate of the loudspeaker to microphone gain $G_n$ computed according to equation 9. To resolve this problem in a computationally efficient manner, the local speech detector computes the convolution of the adaptive filter tap weights with a bandpass filter having the z transform, $1-z^2$. This attenuates the DC and high frequency components of the adaptive filter's transfer function to zero. The resultant expression for the gain $G_n$ is represented by equation (6) above.

When the echo canceller is first turned on, the tap weights will not yet accurately model the room's acoustic characteristics. Accordingly, for the first ten seconds after speech begins arriving from the far end, the local speech detector sets $G_n$ to a start up value. The start up value is approximately set to the largest possible loudspeaker to microphone gain. Thus, the device is much more likely during this start up phase to conclude that loudspeaker feedback is the predominate component of the microphone signal. This strategy encourages the local speech detector to liberally allow the tap weights to adjust when the system is first turned on and then become more selective in enabling tap weight adjustment after the adaptive filter has at least partially learned the room's acoustic characteristics.

Determining whether the microphone signal contains near end speech is complicated by the room's reverberance. More specifically, the sound from the loudspeaker will reverberate in the room for some time after the loudspeaker is silent. Unless precautions are taken, the local speech detector may mistake the presence of those reverberations in the microphone signal for speech since, during reverberance, the loudspeaker may be silent. As explained below, local speech detector 56 avoids this problem by adjusting the delay factor D in accordance with the recent history of the loudspeaker signal. If the loudspeaker signal was recently intense (thereby inducing reverberance), delay factor D is set relatively high to increase the magnitude of the microphone signal required for detector 56 to conclude that local speech is occurring.

Detector 56 initializes the delay factor D to zero. Referring to FIG. 5, as each new sample of the bandlimited speech signal $s_n(i)$ arrives, the detector compares the magnitude of the sample to the value of D. (Step 122). If the magnitude of new sample is greater than the present delay factor D, detector 56 increases D to the magnitude of the new sample. (Step 124). If the new sample is less than or equal to D, detector 56 reduces the magnitude of D by 0.5% of its present value. (Step 126) Thus, the gain decreases slowly from the most recent peak in the loudspeaker signal until a new sample of the loudspeaker signal arrives which is above the gain. The rate of decay is preferably set to approximate the rate at which reverberance dampens. The desired rate may therefore vary with the room characteristics. Further, since reverberance may decay much more rapidly in high frequency bands than in lower frequency bands, different decay rates may be used for each band.

Even if tap weight adjustment is disabled during local speech, the tap weights may still diverge if the loudspeaker emits a sinusoidal or other periodic signal (e.g., if someone at the far end whistles). Whitening filters 14 and 28 discourage such divergence but cannot eliminate it for such extremely narrow bandwidth signals. Accordingly, each tap weight adjustment module 58 (see FIG. 3) continuously compares the energy of the echo corrected microphone signal $m'_n(i)$ to the energy of the uncorrected microphone signal $m_n(i)$. If the corrected signal has at least twice as much energy as the uncorrected signal, divergence is declared for that band and all tap weights are set to zero for that band. All other bands remain unchanged.

Figure 6:
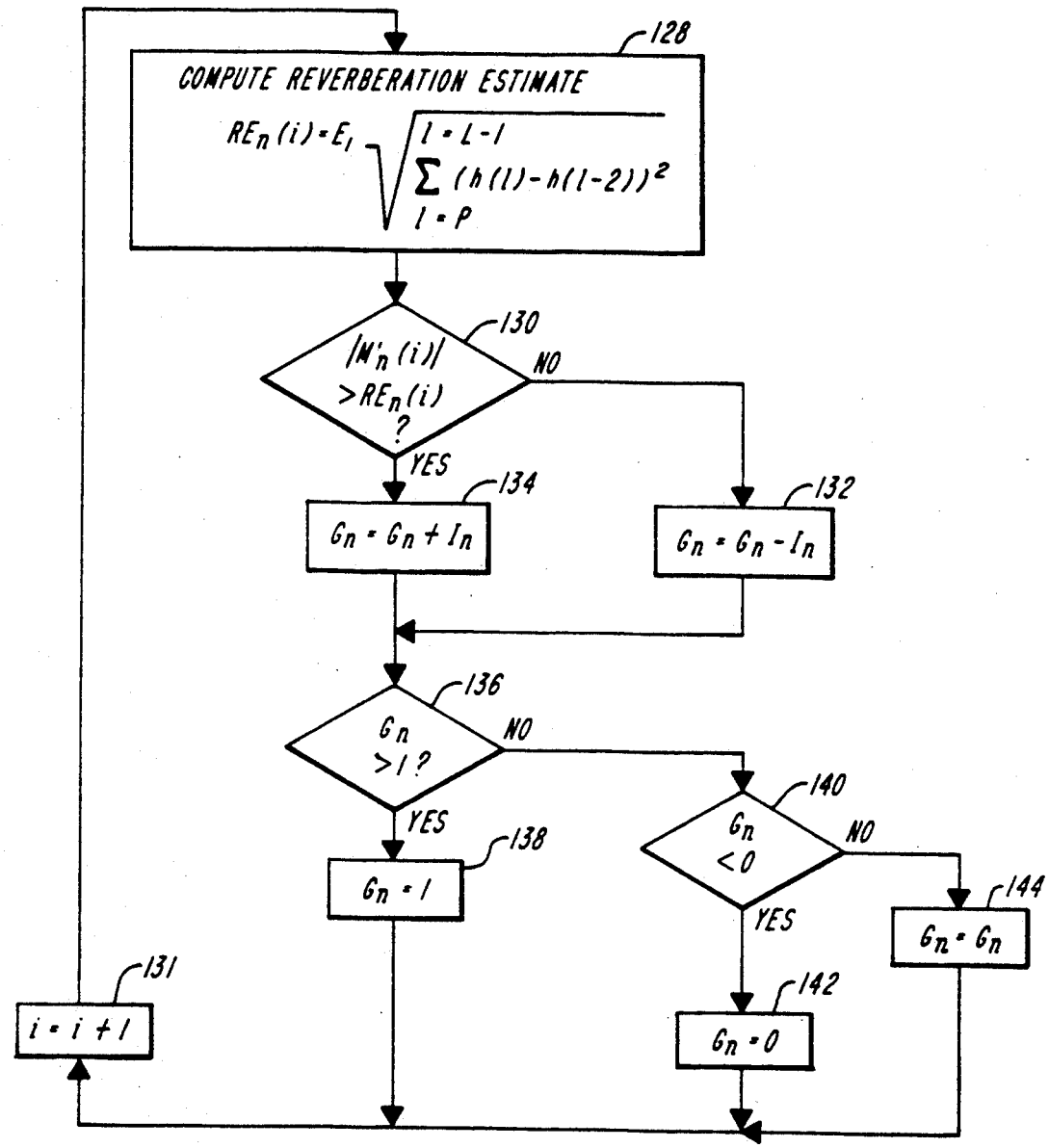
FIG. 6 is a flow chart illustrating a procedure for implementing a variable gain signal clipper.

Referring to FIG. 6, the following describes the operation of center clipper 20 in further detail. As explained above, center-clipping is designed to eliminate residual echo by reducing the microphone signal to zero during periods when no one is speaking at the near end (i.e., no "local speech"). This technique obviously does nothing to remove residual echo during periods when someone is speaking at the near end. However, the residual echo is not noticeable during these periods since it is masked by the local speech.

As explained above, there may be local speech in certain bands, and not in others, as for example when someone whistles into the microphone. Accordingly, center-clipping independently operates in each band, clipping the microphone signal in bands having no local speech and passing it in bands containing local speech.

To determine whether there is local speech in a band n, clipper 20 first computes a reverberation estimate $RE_n(i)$ level of the residual echo in the band. (Step 128). The clipper computes the reverberation estimate as follows:

$$RE_n(i) = E_l \times \sqrt{\sum_{l=P}^{l=L-1} ((h_n(l) - h_n(l-2))^2} \quad (10)$$

where $E_l$ is the loudspeaker energy and P is a constant which is slightly greater than the propagation time (in samples) for the acoustic signal to propagate from the loudspeaker to the microphone. Those skilled in the art will recognize that the square root factor in equation (10) represents the energy of reverberations induced in the room by a hypothetical impulse signal issued by the loudspeaker. Since such reverberations tend not to be removed by echo cancellation, the estimate of such reverberations provides a reasonable estimate of this residual echo. The clipper compares the echo corrected microphone signal $m'_n(i)$ to the reverberation estimate $RE_n(i)$. (Step 130).

If $m'_n(i)$ is less than or equal to the reverberation estimate $RE_n(i)$, clipper 20 assumes there is no local speech, and begins clipping the microphone signal $m'_n(i)$. However, rather than immediately clipping the signal, clipper 20 gradually reduces the gain $G_n$ of the band's clipper circuit to zero. More specifically, the output of the clipper in band n, $c_n(i)$, is related to the input $m'_n(i)$ as follows:

$$c_n(i) = G_n \cdot m'_n(i) \quad (11)$$

Upon the arrival of each sample of $m'_n(i)$ which is less than or equal to $s'_n(i)$, the gain $G_n$ is decreased by a value $I_n$, 0.05 in the illustrated embodiment, until reaching a minimum value of zero. (See Steps 132, 136, 140, 142). This eliminates a clicking sound which may occur if clipping is introduced more abruptly.

If the microphone signal is greater than the reverberation estimate $RE_n(i)$, clipper 20 assumes there is near end speech and proceeds to remove clipping, allowing the microphone signal $m'_n(i)$ to pass. However, rather than abruptly removing clipping, clipper 20 gradually increases the gain of the clipper circuit (using the same step size as used above i.e., $I_n = 0.05$) until it reaches unity, thereby preventing clicking sounds which may be introduced by abrupt removal of clipping. (See Steps 134, 136, 138, 144).

As explained above, center clipping causes background noise in the room to fade in and out as clipping is activated and deactivated. More specifically, when a person at the near end speaks into the microphone while the listeners at the far end of the communication system remain silent, the remote listeners will hear the background noise in the local room disappear with each pause in the person's voice. To eliminate this effect, noise filler 22 replaces the clipped signal with an artificial noise signal having approximately the same amount of energy as the background noise being clipped. Thus, the echo remains clipped while the background noise is replaced.

Figure 7:
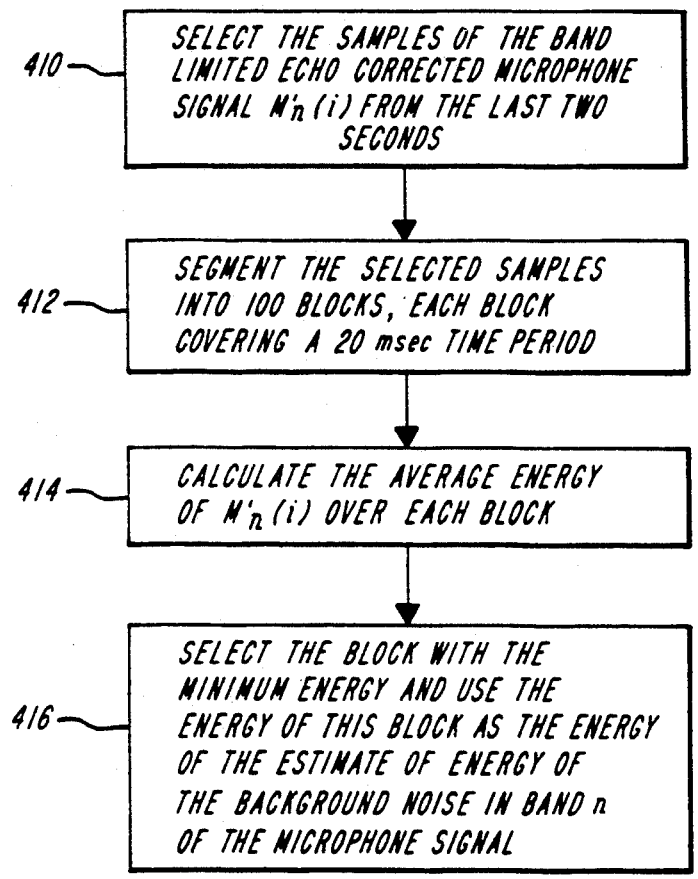
FIG. 7 is a flow chart illustrating a procedure for estimating the energy of the background noise in an echo corrected bandlimited microphone signal.

It is difficult to determine how much of the clipped signal is due to background noise and how much is due to residual echo. To measure the background noise, noise filler 22 examines the history of the echo corrected microphone signal. Presumably, there will be moments when no one is speaking at either end of the communication system. During these moments, the microphone signal contains only the background noise in the room. Referring to FIG. 7, filler 22 attempts to locate those periods and measure the energy of the microphone signal. Toward this end, it breaks the prior samples of the echo corrected microphone signal $m'_n(i)$ into one hundred blocks of samples, each block containing consecutive samples covering a twenty millisecond period of time. (Steps 410, 412). It next calculates the average energy of $m'_n(i)$ over each block. (Step 414). The block having the minimum average energy is assumed to cover a period of time when the microphone signal in band n includes only background noise. Accordingly, the average energy of this block is used as the estimate of the energy of the background noise $E_n$ in the band n. (Step 416).

For each band n, a uniformly distributed pseudo-random noise signal $n_n(i)$ whose energy is equal to that of the estimated background noise is then generated using a random number generator. More specifically, filler 22 first generates a uniformly distributed random signal $u_n(i)$ ranging from $-1$ to $1$ in value using a computationally efficient random number generator such as described in P. L. Chu, "Fast Gaussian Random Noise Generator", IEEE Trans. ASSP, ASSP-37, No. 10, October 1989, p. 1593–1597. The random signal is then scaled such that its energy matches that of the background noise. More specifically, the noise signal $n_n(i)$ is derived from the random signal as follows:

$$n_n(i) = \sqrt{3E_n} \times u_n(i) \quad (12)$$

After preparing an artificial noise signal $n_n(i)$ which has an energy equivalent to the background noise, filler 22 adds the artificial noise to the clipped microphone signal in an amount complementary to the amount of clipping. More specifically, the filler output $d_n(i)$ is computed as follows:

$$d_n(i) = G_n \cdot m'_n + (1 - G_n) \cdot n_n(i) \quad (13)$$

where $G_n$ is the gain of clipper 20 for band n.

Additions, subtractions, deletions and other modifications of the preferred particular embodiments of the inventions will be apparent to those practiced in the art and are within the scope of the following claims.

What is claimed is:

1. In an echo cancelling device for reducing the effects of acoustic feedback between a loudspeaker and microphone in a communication system, comprising:
an adjustable filter for receiving a loudspeaker signal and generating in response thereto an echo estimation signal,
means for subtracting said echo estimation signal from the microphone signal to produce an echo corrected microphone signal, and
means for adjusting transfer characteristics of said filter, during periods of time when the microphone signal is substantially derived from acoustic feedback between the loudspeaker and the microphone, to reduce said echo corrected microphone signal, the improvement comprising:
means for estimating an energy transfer ratio representative of the ratio of the energy of the microphone signal to the energy of the loudspeaker signal, and
means for comparing the microphone signal to the energy transfer ratio multiplied by the loudspeaker signal to identify said periods of time when the microphone signal is substantially derived from acoustic feedback between the loudspeaker and the microphone.

2. The echo cancelling device of claim 1 wherein said means for estimating the energy transfer ratio comprises:
means for computing the average energy of said echo estimation signal,
means for computing the average energy of said loudspeaker signal, and
means for computing the ratio of said average energies.

3. The echo cancelling device of claim 1 wherein said adjustable filter comprises a digital filter having a plurality of adjustable taps wherein the value of said taps define said transfer characteristics of said adjustable filter, and wherein said means for estimating said energy transfer ratio comprises:
means for computing the square of the tap value of each of a plurality of said taps, and
means for summing the squared tap values.

4. The echo cancelling device of claim 1 wherein said adjustable filter comprises a digital filter having a plurality of taps wherein the value of said taps define said transfer characteristics of said adjustable filter, and wherein said means for estimating said energy transfer ratio comprises:
means for filtering a plurality of said tap values with a bandpass filter to produce a plurality of filtered tap values,
means for computing the square of each said filtered tap value, and
means for summing the squared filtered tap values.

5. The echo cancelling device of claim 1 wherein said adjustable filter comprises a digital filter having at least L taps wherein the value of the taps, h(l), define said transfer characteristics of said adjustable filter, and wherein said means for estimating said energy transfer ratio comprises:
means for computing the energy transfer ratio, $G_n$, from said plurality of said taps according to the equation:

$$G_n = \sqrt{\sum_{l=2}^{l=L-1} (h_n(l) - h_n(l-2))^2}$$

6. In an echo cancelling device for reducing the effects of acoustic feedback between a loudspeaker and microphone in a communication system, comprising:
an adjustable filter for receiving a loudspeaker signal and generating in response thereto an echo estimation signal,
means for subtracting said echo estimation signal form the microphone signal to produce an echo corrected microphone signal,
means for adjusting transfer characteristics of said filter, during periods of time when the microphone signal is substantially derived from acoustic feedback between the loudspeaker and the microphone, to reduce the echo corrected microphone signal, and
a clipper for attenuating said echo corrected microphone signal during selected periods of time, the improvement comprising:
means for calculating a reverberation estimate representative of reverberation of the loudspeaker signal,
means for comparing the echo corrected microphone signal to the reverberation estimate, and
means for enabling said signal clipper to attenuate during periods of time when said echo corrected microphone signal is less than said reverberation estimate.

7. The echo cancelling device of claim 6 wherein said adjustable filter comprises a digital filter having a plurality of adjustable taps wherein the values of said taps define said transfer characteristics of said adjustable filter, and wherein said means for calculating said reverberation estimate comprises:
means for computing the square of the tap value of each of a plurality of said taps, excluding at least a first said tap, and
means for summing the squared tap values.

8. The echo cancelling device of claim 6 wherein said adjustable filter comprises a digital filter having a plurality of taps wherein the values of said taps define said transfer characteristics of said adjustable filter, and wherein said means for calculating said reverberation estimate comprises:
means for filtering a plurality of said tap values with a bandpass filter to produce a plurality of filtered tap values,
means for computing the square of each of a plurality of said filtered tap values, excluding at least a first said filtered tap value, and
means for summing the squared filtered tap values.

9. The echo cancelling device of claim 6 wherein said adjustable filter comprises a digital filter having at least L taps wherein the value of the taps, $h_n(i)$, define said transfer characteristics of said adjustable filter, and wherein said means for calculating said reverberation estimate comprises:
means for estimating the propagation time Tp for said loudspeaker signal to propagate to said microphone,
means for computing the reverberation estimate, $RE_n(i)$, from said plurality of said taps according to the equation:

$$RE_n(i) = E_l \times \sqrt{\sum_{l=P}^{l=L-1} (h_n(l) - h_n(l-2))^2}$$

where P is a number approximately equal to or greater than Tp.

10. In a method for reducing the effects of acoustic feedback between a loudspeaker and microphone in a communication system, comprising:
applying a loudspeaker signal to an adjustable filter to generate an echo estimation signal,
subtracting said echo estimation signal from a microphone signal to produce an echo corrected microphone signal,
adjusting transfer characteristics of said filter, during periods of time when the microphone signal is substantially derived from acoustic feedback between the loudspeaker and the microphone, to reduce said echo corrected microphone signal, the improvement comprising the steps of:
estimating an energy transfer ratio representative of the ratio of the energy of the microphone signal to the energy of the loudspeaker signal,
comparing the microphone signal to the energy transfer ratio multiplied by said loudspeaker signal to identify said periods of time when the microphone signal is substantially derived from acoustic feedback between the loudspeaker and the microphone.

11. The method of claim 10 wherein said step for estimating the energy transfer ratio comprises the steps of:
computing the average energy of said echo estimation signal,
computing the average energy of said loudspeaker signal, and
computing the ratio of said average energies.

12. Method of claim 10 wherein said adjustable filter comprises a digital filter having a plurality of adjustable taps wherein the value of said taps define said transfer characteristics of said adjustable filter, and wherein said step of estimating said energy transfer ratio comprises the steps of:
computing the square of the tap value of each of a plurality of said taps, and
summing the squared tap values.

13. The method of claim 10 wherein said adjustable filter comprises a digital filter having a plurality of taps wherein the value of said taps define said transfer characteristics of said adjustable filter, and wherein said step of estimating said energy transfer ratio comprises the steps of:
filtering a plurality of said tap values with a bandpass filter to produce a plurality of filtered tap values,
computing the square of each said filtered tap value, and
summing the squared filtered tap values.

14. The method of claim 10 wherein said adjustable filter comprises a digital filter having at least L taps wherein the value of the taps, $h_n(l)$, define said transfer characteristics of said adjustable filter, and wherein said step of estimating said energy transfer ratio comprises the step of:
computing the energy transfer ratio, $G_n$, from said plurality of said taps according to the equation:

$$G_n = \sqrt{\sum_{l=2}^{l=L-1} (h_n(l) - h_n(l-2))^2}$$

15. In a method for reducing the effects of acoustic feedback between a loudspeaker and microphone in a communication system, comprising the steps of:
applying a loudspeaker signal to an input of an adjustable filter to generate an echo estimation signal,
subtracting said echo estimation signal from the microphone signal to produce an echo corrected microphone signal,
adjusting transfer characteristics of said filter, during periods of time when the microphone signal is substantially derived from acoustic feedback between the loudspeaker and the microphone, to reduce said echo corrected microphone signal,
attenuating said echo corrected microphone signal during selected periods of time, the improvement comprising the steps of:
calculating from said adjusted transfer characteristics a reverberation estimate representative of room's reverberation of said loudspeaker signal,
comparing the echo corrected microphone signal to the reverberation estimate, and
identifying, based on said comparisons said periods of time when said echo corrected microphone signal is less than said reverberation estimate.

16. The method of claim 15 wherein said adjustable filter comprises a digital filter having a plurality of adjustable taps wherein the value of said taps define said transfer characteristics of said adjustable filter, and wherein said step for calculating said reverberation estimate comprises the steps of:
computing the square of the tap value of each of a plurality of said taps, excluding at least a first said tap, and
means for summing the squared tap values.

17. The method of claim 15 wherein said adjustable filter comprises a digital filter having a plurality of taps wherein the value of said taps define said transfer characteristics of said adjustable filter, and wherein said step for calculating said reverberation estimate comprises the step of:
filtering a plurality of said tap values with a bandpass filter to produce a plurality of filtered tap values,
computing the square of each of a plurality of said filtered tap values, excluding at least a first said filtered tap value, and
summing the squared filtered tap values.

18. The method of claim 17 wherein said adjustable filter comprises a digital filter having at least L taps wherein the value of the taps, $h_n(l)$, define said transfer characteristics of said adjustable filter, and wherein said step for calculating said room reverberation estimate comprises the step of:
estimating the propagation time Tp to said loudspeaker signal to propagate to said microphone, and computing the room reverberation estimate, $RE_n(i)$, from said plurality of said taps according to the equation:

$$RE_n(i) = E_l \times \sqrt{\sum_{l=P}^{l=L-1} (h_n(l) - h_n(l-2))^2}$$

where p is a number approximately equal to or greater than Tp.

* * * * *

UNITED STATES PATENT AND TRADEMARK OFFICE
CERTIFICATE OF CORRECTION

PATENT NO. : 5,263,019

DATED : November 16, 1993

INVENTOR(S) : Peter L. Chu

It is certified that error appears in the above-identified patent and that said Letters Patent is hereby corrected as shown below:

Column 3, line 56, delete open parenthesis before "$(h_n(1) - $";

Column 4, line 13, delete open parenthesis before "$(h_n(1) - $";

Column 11, line 16, delete open parenthesis before "$(h_n(1) - $";

Column 13, line 38, delete open parenthesis before "$(h_n(1) - $";

Column 10, line 68, delete "." after "updates";

Other Publications, line 14, pg. 2, delete repeated data

Signed and Sealed this

Nineteenth Day of September, 1995

Attest:

BRUCE LEHMAN

Attesting Officer     Commissioner of Patents and Trademarks